(12) United States Patent　(10) Patent No.: US 8,434,895 B2
Quinto　(45) Date of Patent: May 7, 2013

(54) LUMINARIES FOR OUTDOORS AND PUBLIC ROADS WITH LEDS AS ILLUMINATING ELEMENTS

(76) Inventor: Alfredo Villafranca Quinto, Mexico City (MX)

(*) Notice: Subject to any disclaimer, the term of this patent is extended or adjusted under 35 U.S.C. 154(b) by 65 days.

(21) Appl. No.: 12/668,252

(22) PCT Filed: Jul. 17, 2009

(86) PCT No.: PCT/MX2009/000075
§ 371 (c)(1),
(2), (4) Date: Apr. 11, 2011

(87) PCT Pub. No.: WO2010/140875
PCT Pub. Date: Dec. 9, 2010

(65) Prior Publication Data
US 2011/0176300 A1　Jul. 21, 2011

(30) Foreign Application Priority Data
Jun. 5, 2009　(MX) .................... MX/a/2009/006022

(51) Int. Cl.
*F21V 21/00*　(2006.01)

(52) U.S. Cl.
USPC ....... 362/249.02; 362/240; 362/294; 362/373

(58) Field of Classification Search ................. 362/240, 362/294, 373, 249.02
See application file for complete search history.

(56) References Cited

U.S. PATENT DOCUMENTS

| 6,498,355 | B1* | 12/2002 | Harrah et al. | 257/99 |
| 2007/0062032 | A1* | 3/2007 | Ter-Hovhannissian | 29/840 |
| 2009/0046460 | A1* | 2/2009 | Li | 362/240 |

* cited by examiner

*Primary Examiner* — Ali Alavi
(74) *Attorney, Agent, or Firm* — Schmeiser, Olsen & Watts, LLP

(57) ABSTRACT

A luminary for exteriors and public carriageways includes a plate of fixed LEDs, the plate has aluminum in a superior section; a dielectric adhesive is located on an interior face, which isolates the plate electrically from a layer which forms electrical copper tracks that serve to make electrical connections between the LEDs, the tracks are connected in series with a power supply; and resting on these tracks and the dielectric adhesive is a final layer of isolating "white" dielectric film.

4 Claims, 2 Drawing Sheets

Cross Section of MCPCB

Heat Transmission of the LED through the Aluminium

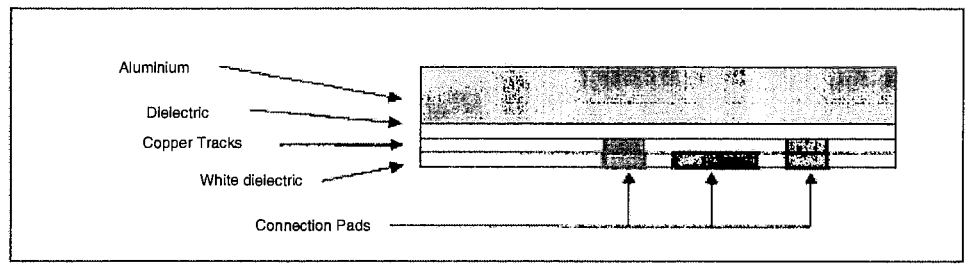
Figure 1 Cross Section of MCPCB
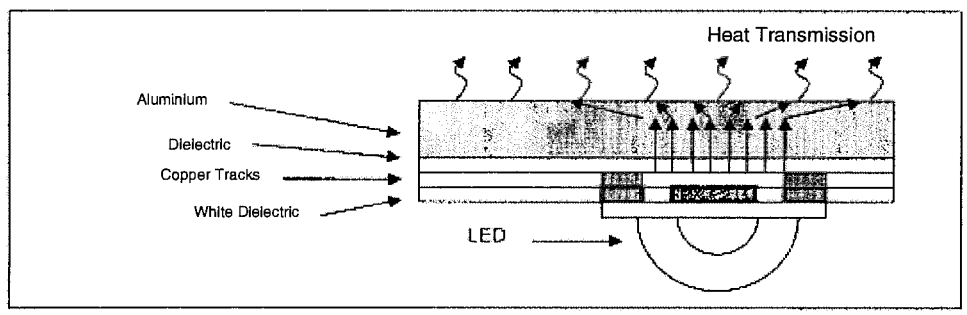
Figure 2 Heat Transmission of the LED through the Aluminium

4.1 MCPCB Drawing, ONILED 2036AC With CREE LEDs

4.3 MCPCB Drawing, ONILED 2018AC With CREE LEDs

LUMINARIES FOR OUTDOORS AND PUBLIC ROADS WITH LEDS AS ILLUMINATING ELEMENTS

FIELD OF INVENTION

The presented invention is related to the LED Luminary production Industry for exterior lighting. These luminaries are capable of lighting public streets/carriageways. This invention is more specifically related to the manufacture of luminaries with the capability of illuminating public streets and carriageways using LED lighting technology.

BACKGROUND OF THE INVENTION

Technically, luminaries exist that can illuminate streets, buildings, warehouses, factories, parking allotments, pedestrian walkways and parks but these use incandescent luminaries and vapor based bulbs.

LED Luminaries do exist already but they weigh much more than the present invention. To avoid overheating the LEDs, heat is dissipated using a large heat-sink, which sometimes forms part of the casing.

To achieve effective heat dissipation, some luminaries use a "heat sink" but these can be considerably heavier.

Therefore a Light and smaller Luminary will have a competitive advantage with respect to these other Luminaries at the technical level, as well as having a competitive illumination capability.

This new luminary can reduce the consumption of energy considerably, but nevertheless give out an intensity of Light equal to other luminaries. This reduces the consumption of fossil fuels and saves money for the end-user, in the long term. LEDs also have a lifetime of between 10-20 years depending on the daily hourly usage of the Luminary. The power supply could fail after 5 years but with simple maintenance, the luminary could function equally as before. LEDs are very robust.

Considering the thermal aspects of the luminaries and the state of the technology, each LED needs to dissipate heat produced and if these LEDs are too close together, they can affect the functionality and the light output. It is recommended that each LED should have 1 inch squared area immediately available surrounding it, on the aluminium plate, in order to dissipate heat effectively.

We can also deduce that many state of the art luminaries with an equivalent power or light output are excessive in weight and could be more than three times heavier.

The use of LEDs, give these types of luminaries a greater useful life with less electrical consumption and lower heat dissipation.

INVENTION OBJECTIVES

One of the objectives of the present invention is to achieve a small and light luminary.

Another objective of the present invention is to achieve a luminary that permits a saving in the consumption of energy in comparison to other luminaries of equivalent power or light output.

Yet another objective is to achieve an adequate dissipation of heat produced by the LEDs with only an Aluminium plate.

Another objective is to have a luminary that neither captures parasitic signals nor radiates any signals and that has a power factor as high as possible.

Other objectives will become apparent with the detailed description accompanied with drawings and fine illustrations which are included in the present document.

BRIEF DESCRIPTION OF THE INVENTION

In a few words, the present invention originates in a structure of LED organization that makes this type of luminary, lighter and smaller than the current state of the technology with competitive illuminance.

To achieve these luminary characteristics, it was necessary to confront problems of heat dissipation generated by the LEDs, harmonic and noise issues, in as much generated as captured by the formation of antennas by the LED connecting tracks. These aspects of the design had to be considered in detail.

Because of these considerations the said luminary utilizes a multi-layer plate. The top of the plate is fabricated out of aluminium. Beneath this, a dielelectric material is used to isolate the aluminium from the foil pattern of the electrical connections and inferior face. This dielectric material is an electrical isolator but also a very good heat conductor.

The foil pattern/power tracks of the LEDs are located on the surface of the dielectric material. This is how the LEDs get the required power to function. The tracks are made of copper and the foil pattern has been laid out to avoid the formation of an antenna. This should avoid radiating or capturing other external radiation.

Above the tracks there is another layer of white dielectric material, in all of the zones apart from the terminals of the LEDs and the pads located between the terminals of the LEDs, which also dissipate the heat generated by the LEDs.

The track distribution used to connect the LEDs is in a precise order and the tracks do not need to cross each other. This was also an objective of the present invention and allows the luminary to comply with the neutralization of antenna effects that may be caused by the copper tracks.

The LEDs are numbered in an order on the Metal Core Printed Circuit Board starting from the uppermost line, left to right and moving to the next line immediately below it until all the last line is reached.

This distribution is the result of multiple experiences and versions of layouts, that now there is no clear rule for how the antenna effect is neutralized with this distribution of LEDs.

In the case of the present invention and the modality which uses 36 LEDs, the LEDs are distributed forming 3 upper lines of 6 LEDs each. Afterwards there is an inferior line of 5 LEDs, followed by three lines of 4 LEDs, terminating with two lines of 3 LEDs and lastly 2 LEDs.

The order of connection is DS9, DS20, DS21, DS22, DS23, DS24, DS25, DS36, DS35, DS34, DS33, DS32, DS31, DS25, DS26, DS27, DS28, DS29, DS30, DS13, DS14, DS15, DS9, DS8, DS7, DS1, DS2, DS3, DS4, DS5, DS6, DS12, DS11, DS10, DS16, DS17 and DS18.

All of this is achieved without the tracks crossing. All of the LEDs are in series and one track leads from the connector to the first LED, runs towards the bottom of the plate, until it reaches the last line of LEDs, afterwards it runs toward the left until it overtakes the extreme left of the last line and follows in parallel form the edge of the LEDs on the left hand side until it reaches the next LED.

Although it is not necessary the LEDs in each line are equidistant and the lines are also equidistant.

In the modality of 18 LEDs, the LEDs form the same structure of lines, but two lines of LEDs form the most superior part of the array that are followed by four lines and to make the position of the LED clearer the co-ordinates of the LEDs are shown in table 1. On the left hand side the LED number corresponds to the LED number of the previous modality in the same position.

TABLE 1

LED Co-Ordinates on the array

| LED. | Posición X.(mm) | Posición Y.(mm) |
|---|---|---|
| 2(DS14) | 252.024 | 458.99928 |
| 5(DS13) | 387.024 | 458.99928 |
| 7(DS15) | 207.024 | 413.99928 |
| 9(DS8) | 297.024 | 413.99928 |
| 10(DS9) | 342.024 | 413.99928 |
| 12(DS1) | 432.024 | 413.99928 |
| 14(DS16) | 252.024 | 368.99928 |
| 17(DS2) | 387.024 | 368.99928 |
| 19(DS17) | 229.524 | 323.99928 |
| 21(DS7) | 319.524 | 323.99928 |
| 23(DS3) | 409.524 | 323.99928 |
| 24(DS18) | 252.024 | 278.99928 |
| 27(DS4) | 387.024 | 278.99928 |
| 29(DS10) | 297.024 | 233.99928 |
| 30(DS5) | 342.024 | 233.99928 |
| 33(DS11) | 319.524 | 188.99928 |
| 35(DS12) | 297.024 | 143.99928 |
| 36(DS6) | 342.024 | 143.99928 |

The connection order in this modality is the following: DS13, DS14, DS15, DS9, DS8, DS7, DS1, DS2, DS3, DS4, DS5, DS6, DS12, DS11, DS10, DS16, DS17, DS18.

To better understand the characteristics, accompanying this description of the invention are the drawings to illustrate what is mentioned in the following passages

BRIEF DESCRIPTION OF THE FIGURES

FIG. 1 is a transversal view of the Metal Core Printed Circuit Board (MCPCB) where the LEDs are mounted, showing the layers.

FIG. 2 is the electrical connection diagram which shows how the LEDs are connected to the copper tracks and how heat is dissipated into the aluminum backplane.

Figure 3:
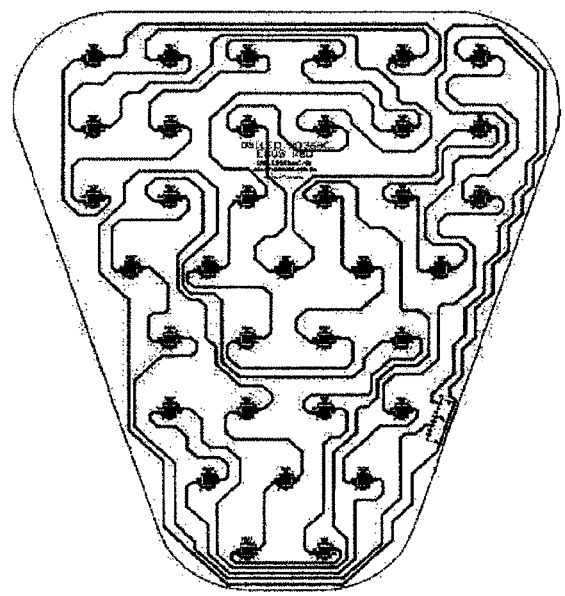
FIG. 3 illustrates the connections and locations of the LEDs on the MCPCB in the 36 LED modality.

To understand the invention in even more depth, a detailed look will be taken into one of the modalities, represented by the detailed illustrations which are annexed to the present document.

DETAILED DESCRIPTION OF THE INVENTION

In order to execute the objectives presented in this invention, it is fundamentally required to use a structure that permits the diffusion of heat generated by the LEDs, to the immediate environment. It is also necessary to distribute and connect the LEDs to avoid the antenna effect of the copper tracks, once the LEDs are connected in series.

Besides the antenna effects that can be resolved with the distribution and the way the LEDs are connected, the MCPCB is connected with a "Wire Braid" cable and a power cable that has noise protection built into its sheathing. It is also necessary to place a ferrite coupler onto the power cable to further reduce noise pick-up.

In the assembly process of the luminary, it is necessary to use and O-Ring which sits comfortably at the Edge of the polycarbonate casing. When the luminary is closed this acts as a seal.

The MCPCB is sealed with a special adhesive that connects the aluminium to the polycarbonate permanently. A thin layer of silicon is added on op off this to ensure that no leaks exist in this mechanical connection.

The luminary has a transparent polycarbonate to allow Light to pass through. There is a loss of 12 percent through this material but it is light, flexible and does not break easily and can survive hard/solid impacts The LEDs are connected sufficiently close to allow Light to leave at 80 degrees about the vertical, with minimum rebounds from the casing.

Each LED carries a protection device, if one LED fails, a component in parallel makes a bypass. This avoids a catastrophic failure, so that the luminary does not switch off all the LEDs for only a one component fault.

The elimination/re-direction of heat is achieved in the present invention using a "Metal Core Printed Circuit Board" (MCPCB). This metal plate can be made to mount different LEDs. The LEDs are the load for the power supply. Many of these high brightness LEDs share the same electrical characteristics. If the design voltage is around 3.2 (Vf) and the consumption is 350 mA, the luminary can utilize them.

Additionally it is necessary to look at the optical characteristics such as the angle of the Light output, in order to have the best quantity of light emerging from the luminary for a given illumination area.

These are the characteristics of the Luminary that permit the client to have the quantity, color and angle required for their application.

To achieve effective heat dissipation, the luminary employs a metal plate that unifies the LEDs electrically and mechanically.

This plate is named a "Metal Core Printed Circuit Board" (MCPCB)

FIG. 1 shows a transversal view of the metal plate where the LEDs are connected, showing the individual. Layer 1 shows the aluminium plate on which the remaining layers are mounted. Layer 2 show the dielectric layer that is isolated electrically but allows very good conduction of heat toward the aluminium plate.

Upon this layer, the copper tracks and terminals are laid which connect the LEDs electrically. Above these layers lies a final layer of white dielectric material (layer4).

FIG. 2 shows the way that the LEDs are connected electrically with tracks of copper and how the heat is diffused toward the aluminium plate. In this figure, apart from the previously mentioned elements in the description of FIG. 1, one can appreciate the led 5 and the flow of heat 6.

FIG. 3 illustrates the connection and the location of the LEDs 5 in the MCPCB plate, in the 36 LED modality. The connections are made by the copper tracks 3.

Figure 4:
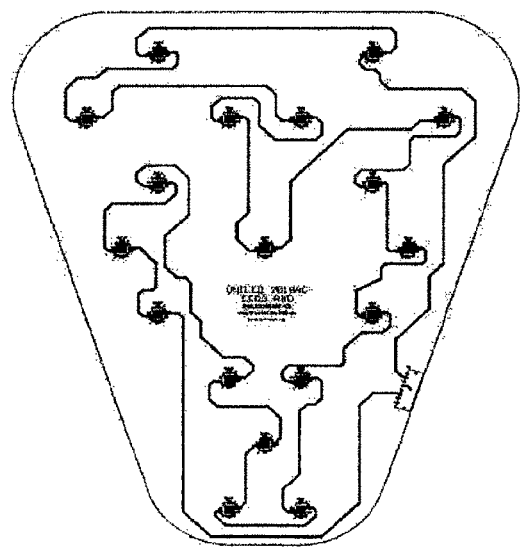
FIG. 4 illustrates connections and the location of the LEDs on the MCPCB for the 18 LED modality.

FIG. 4 illustrates the connection and the location of LEDs in the MCPCB plate in the 18 LED modality. The same elements shown in FIG. 3 are shown here.

Due to the characteristics of the MCPCB plate it is feasible to connect various types of LEDs, but keeling the same organization of the connections. The modalities illustrated in FIGS. 3 and 4 are realized for the CREE™ LEDs. It is also feasible to use the same plates for OSRAM™ LEDs. However for this organization of LEDs, less surface area is required.

The invention has been described sufficiently well enough that a person with technical know-how in the matter, could reproduce and obtain the results mentioned in the present invention. Nevertheless any person with technical capability, working with this technology is capable of making modifications not described in the present application.

The material that has been described is required to vindicate the aforementioned structures. These need to be understood within the framework of the invention to apply modifications in a determined structure or in the manufacturing process itself.

Having described the invention it is considered novel, and is claimed for as proprietary content in the following statements:

1. A luminary for exteriors and public carriageways comprising:
   a plate of fixed LEDs, said plate includes aluminum in a superior part, the plate of fixed LEDs also forms part of the casing being located in the superior part of the luminary with the aluminum exposed to the environment that forms an upper facing part of the luminary;
   a dielectric adhesive located on an interior face that electrically isolates said plate from a layer which forms electrical copper tracks that make electrical connections between the LEDs, said electrical copper tracks are connected in series with a power supply; and
   an isolating white dielectric film resting on the electrical copper tracks, the isolating white dielectric film is a dielectric adhesive;
   wherein the LEDs are connected in series and in an arrangement and a specific order to neutralize an antenna effect caused by the electrical copper tracks.

2. The luminary of claim 1, wherein, when in parallel with each LED, there is an electrical circuit that places a short circuit in parallel to the LED when the LED stops working, allowing the luminary to continue illuminating adequately.

3. The luminary of claim 1, further including 18 LEDs which are connected in series and the specific order is: DS13, DS14, DS15, DS9, DS8, DS7, DS1, DS2, DS3, DS4, DS5, DS6, DS12, DS11, DS10, DS16, DS17, DS18, with the LEDs numbered from left to right and from top to bottom and without the copper tracks crossing each other.

4. The luminary of claim 1, further including 36 LEDs which are connected in series and the specific order is: DS9, DS20, DS21, DS22, DS23, DS24, DS25, DS36, DS35, DS34, DS33, DS32, DS31, DS25, DS26, DS27, DS28, DS29, DS30, DS13, DS14, DS15, DS9, DS8, DS7, DS1, DS2, DS3, DS4, DS5, DS6, DS12, DS11, DS10, DS16, DS17, DS18, with the LEDs numbered from left to right and from top to bottom and without the copper tracks crossing each other.

* * * * *